United States Patent Office 3,102,072
Patented Aug. 27, 1963

3,102,072
HYPNOTIC COMPOSITION COMPRISING BARBITURIC ACID DERIVATIVES AND N,N-DISUBSTITUTED - β - AMINOISOPROPYL-(P-CHLORO-α-METHYL-BENZHYDRYL)-ETHERS
Herbert Arnold, Bielefeld, Engelbert Kühas, Gadderbaum, and Norbert Brock, Verentrup, uber Bielefeld, Germany, assignors to Asta-Werke Aktiengesellschaft, Brackwede, Westphalia, Germany, a corporation of Germany
No Drawing. Filed Mar. 22, 1962, Ser. No. 181,808
Claims priority, application Germany May 30, 1959
8 Claims. (Cl. 167—52)

This invention relates to novel hypnotics and, more particularly, to a new combination of products exerting favorable effectiveness as hypnotics.

5-disubstituted barbituric acid derivatives and their salts are known as hypnotics. However, such barbiturates have certain disadvantages. There is particularly danger of drug addiction and harmful effects to the nervous system after prolonged administration.

It is therefore an object of the present invention to provide for a hypnotic which does not have the above indicated disadvantages of the pure barbiturate prescriptions.

Further objects of the present invention and advantages thereof will become apparent as the description proceeds.

The hypnotics of the invention comprise, in combination a 5,5-disubstituted barbituric acid derivative exerting hypnotic effectiveness, and a compound selected from the group consisting of a N,N-disubstituted β-aminoisopropyl-(p-chloro-α-methyl-benzhydryl)-ether of the general formula

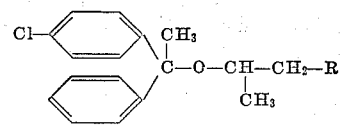

wherein R is a member selected from the group consisting of dimethylamino, diethylamino, piperidino and morpholino
and non-toxic acid addition salts thereof.

Particularly good effects are obtained with β-N,N-dimethylamino-isopropyl - (p-chloro-α-methyl-benzhydryl)-ether, and its non-toxic acid addition salts such as the chloride, bromide and citrate.

Particularly useful as 5,5-disubstituted barbituric acid derivatives in the combination according to the present invention are those wherein at least one of the substituents in the 5-position represents a groupment which may be readily oxidised such as alkyl or cyclic alkyl groups containing an ethylenic double bond. Such substituents are, for instance allyl, crotyl, cyclohexenyl, cyclopentenyl. Other groups are furfuryl for instance. A compound producing particularly good results is 5-ethyl-5-crotyl barbituric acid. Further examples are 5-ethyl-5-cyclohexenyl barbituric acid, 5-methyl-5-cyclohexenyl-N-methyl barbituric acid, 5-furfuryl-5-isopropyl barbituric acid, 5-cyclopentenyl-5-allyl-barbituric acid, 5-isopropyl-5-(β-bromo-allyl) barbituric acid, 5-sec. butyl-5-(β-bromo-allyl) barbituric acid. All of these barbituric acid derivatives may be used as acid or as salts, particularly the sodium, potassium, calcium and magnesium salts.

The compounds of the combination are preferably combined in molar proportions ranging from 1 mol of the N,N-disubstituted β-amino-isopropyl-(p-chloro-α-methyl-benzhydryl)-ether derivative to from about 4 to about 15 mols and, preferably, to from about 9 to about 15 mols of the barbituric acid derivative. But the barbiturate-narcosis may be substantially increased with as small molar proportions as 1:45. The molar proportions of the two ingredients depends to a certain extent from the hypnotic effectiveness of the barbituric acid derivative. With respect to β-N,N-dimethyl-amino-isopropyl-(p-chloro-α-methyl-benzhydryl)-ether a particularly useful molar proportion is 1 mol of the ether derivative to about 12 mols of the barbituric acid derivative.

By combining a small amount of the N,N-disubstituted β - amino - isopropyl - (p - chloro-α-methyl-benzhydryl)-ether derivative with the 5,5-disubstituted barbituric acid derivative it is possible to decrease substantially the dosage of the barbituric acid derivative for obtaining the same hypnotic effect. This is of particular importance as hypnotics in these days are taken over years so that the danger of drug addiction or of harmful and undesired side-effects to the nervous system is also considerably decreased.

The invention will become more apparent by the following tests:

TEST NO. 1

The test was carried out with male rats weighing 120 to 180 g. β-N,N-dimethyl-amino-isopropyl-(p-chloro-α-methyl-benzhydryl)-ether hydrochloride is administered intraperitoneally in rising doses. 30 minutes thereafter the sodium salt of 5-($\Delta^{1,2}$-cyclohexenyl)-5-methyl-N-methyl barbituric acid was administered intravenously in an amount of 68 mg./kg. which is the effective dose $DE_{95}$, i.e. the dose causing lateral decubitus with a probability of 95%. The prolongation of the narcosis produced with the barbiturate alone is given in the following Table I:

Table I

| Amount of test compound administered previously | Prolongation of barbiturate narcosis |
|---|---|
| 2.4 mg | 2 times. |
| 3.2 mg | 3 times. |
| 4.2 mg | 4 times. |
| 6.2 mg | 5 times. |

It follows from Table I that already with a molar proportion of 1 mol of the ether derivative to 45 mols of the barbituric acid derivative the barbiturate narcosis is doubled in time or the amount of the barbituric acid derivative may be reduced correspondingly in order to obtain the same narcosis time.

TEST NO. 2

0.162 mmol/kg. of (350 mg./kg.) of 5-ethyl-5-crotyl barbituric acid were administered to male rats. This amount corresponds to the effective dose $DE_5$, i.e. the dose causing lateral decubitus with a probability of 5%. Thereafter the compounds indicated in Table II were administered to the test animals with rising doses. It was determined in the lateral decubitus test whether the test animals fully fell asleep. The amount of the ether derivative causing the animals to fully fall asleep is given in table II.

Table II

| Test compound | $DE_{95}$ | |
|---|---|---|
| | mmol/kg. | mg./kg. |
| β-N,N-dimethylisopropyl-(p-chloro-α-methyl-benzhydral)-ether chloride | 0.0383 | 13.3 |
| β-N,N-dimethylisopropyl-(p-chloro-α-methyl-benzhydryl)-ether citrate | 0.004 | 2 |

It follows from Table II that already the small amount of 2 mg./kg. of the citrate of β-N,N-dimethylisopropyl-(p-chloro-α-methyl-benzhydryl)-ether is sufficient to produce a full sleep in the test animal after the low effective barbituric dose $DE_5$.

The new hypnotics according to the present invention are produced by mixing the ingredients with known additives for producing tablets or suppositories. A tablet or suppository of usual weight may for instance contain 0.15 g. of 5-ethyl-5-crotyl barbituric acid and 0.03 g. of β-N,N - dimethylaminoisopropyl-(p-chloro-α-methyl - benzhydryl)-ether citrate. One tablet or one suppository is a suitable dose of administration.

The active ingredients of the hypnotics according to the present invention may be produced in manners known per se. For instance 5-ethyl-5-crotyl barbituric acid may be prepared by reacting ethyl-crotyl malonic acid diethylester with urea in a suitable solvent and the N,N-disubstituted β-amino-isopropyl-(p-chloro-α-methyl-benzhydryl)-ethers may be prepared in accordance with the following examples.

EXAMPLE 1.—β-DIMETHYLAMINO-ISOPROPYL-(4-CHLORO-α-METHYL-BENZHYDRYL)-ETHER 1073 g. of 4-chloro-α-methyl-benzhydrol are dissolved in 3 litres of dry toluene. 202 g. of sodamide are added to the resulting solution while stirring.

After 15 minutes, 543 g. of 1-dimethylaminoisopropyl chloride are added and the mixture is heated at boiling point for 2 hours after the reaction has subsided. Water is added to the cooled reaction mixture. After separating out the aqueous layer, the toluene solution is washed three times with water and dried over sodium sulphate. The toluene is extracted and the residue is fractionated in vacuo. 1100 g. of β-dimethylaminoisopropyl-(4-chloro-α-methylbenzhydryl)-ether are obtained. The product has a boiling point at 0.6 mm. Hg of 154–160° C. The yield is 75% of the theoretical.

The citrate of the compound is obtained by dissolving 1000 g. of the base in 4 litres of acetone and adding 604 g. of anhydrocitric acid to the resulting solution. The mixture is heated on a steam bath until a solution is formed and is thereafter cooled. The precipitated salt is filtered with suction and recrystallized from alcohol. Yield: 1100 g.=68% of the theoretical. M.P. 120–124° C.

EXAMPLE 2.—β-DIETHYLAMINO-ISOPROPYL-(4-CHLORO-α-METHYLBENZHYDRYL)-ETHER

If 4-chloro-α-methylbenzhydrol is reacted with diethyl-aminoisopropyl chloride in toluene in the presence of sodamide as described in Example 1, the β-diethylamino-isopropyl-(4-chloro - α - methylbenzhydryl)-ether is obtained. B.P.$_{0.7 \text{ mm. Hg}}$ 160–165° C.

The citrate of this compound is obtained as described in Example 1 and has a melting point of 105–108° C.

EXAMPLE 3.—β-PIPERIDINO-ISOPROPYL-(4-CHLORO-α-METHYLBENZHYDRYL)-ETHER

If 4-chloro-α-methylbenzhydrol is reacted with piperidino-isopropyl-chloride in toluene in the presence of sodamide as described in Example 1, the β-piperidino-isopropyl-(4-chloro-α-methylbenzhydryl)-ether is obtained, B.P.$_{0.7 \text{ mm. Hg}}$ 187–197° C.

The citrate of this compound is obtained as described in Example 1 and has a melting point of 119–125° C.

EXAMPLE 4.—β-MORPHOLINO-ISOPROPYL-(4-CHLORO-α-METHYLBENZHYDRYL)-ETHER

If 4-chloro-α-methylbenzhydryl is reacted with morpholino-isopropyl chloride in toluene in the presence of sodamide as described in Example 1, the β-morpholino-isopropyl-(4-chloro - α - benzhydryl)-ether is obtained, B.P.$_{0.3 \text{ mm. Hg}}$ 195–202° C.

The citrate of this compound is obtained as described in Example 1 and has the melting point of 143–150° C.

This application is a continuation-in-part of co-pending application Serial No. 29,177, filed on May 16, 1960, entitled "Novel N,N-Disubstituted β-Aminoalkylether of Alcohols of the Aromatic-Aliphatic Series and a Process for the Production Thereof."

What we claim is:

1. A novel hypnotic composition comprising, a 5,5-disubstituted barbituric acid derivative and a compound selected from the group consisting of a N,N-disubstituted β-amino-isopropyl-(p-chloro-α-methyl-benzhydryl) - ether of the general formula

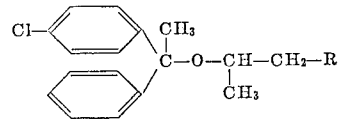

wherein R is a member selected from the group consisting of dimethylamino, diethylamino, piperidino, and morpholino, and non-toxic acid addition salts thereof, and a pharmaceutically acceptable carrier.

2. A novel hypnotic composition according to claim 1 comprising, in combination, one mol of the ether derivate per from 4 to 15 mols of the barbituric acid derivative.

3. A novel hypnotic composition comprising, a 5,5-disubstituted barbituric acid derivative, at least one of the substituents representing a member selected from the group consisting of an alkylene and a cyclic alkylene radical containing an ethylenic double bond, and a compound selected from the group consisting of a N,N-disubstituted β-amino-isopropyl-(p-chloro-α-methyl-benzhydryl) - ether of the general formula

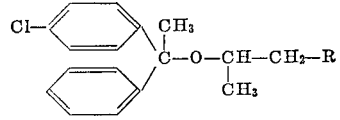

wherein R is a member selected from the group consisting of dimethylamino, diethylamino, piperidino, and morpholino, and non-toxic acid addition salts thereof, and a pharmaceutically acceptable carrier.

4. A novel hypnotic composition according to claim 3 comprising, in combination one mol of the ether derivative per from 4 to 15 mols of the barbituric acid derivative.

5. A novel hypnotic composition comprising a compound selected from the group consisting of 5-ethyl-5-crotyl barbituric acid and the non-toxic salts thereof, and a compound selected from the group consisting of a N,N-disubstituted β-amino-isopropyl-(p-chloro-α-methyl-benzhydryl)-ether of the general formula

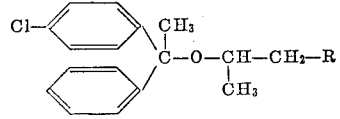

wherein R is a member selected from the group consisting of dimethylamino, diethylamino, piperidino, and morpholino, and non-toxic acid addition salts thereof, and a pharmaceutically acceptable carrier.

6. A novel hypnotic composition according to claim 5 comprising, in combination, one mol of the ether derivative per from 4 to 15 mols of the barbituric acid derivative.

7. A novel hypnotic composition comprising, a compound selected from the group consisting of 5-ethyl-5-crotyl barbituric acid, its sodium, potassium, calcium and magnesium salts, and a compound selected from the group consisting of β-N,N-dimethyl-amino-isopropyl-(p-chloro-α-methyl-benzhydryl)-ether and the non-toxic acid addition salts thereof, and a pharmaceutically acceptable carrier.

8. A novel hypnotic composition according to claim 7 comprising, in combination, one mol of the ether derivative per from 4 to 15 mols of the barbituric acid derivative.

References Cited in the file of this patent

UNITED STATES PATENTS 2,784,229  Hauslick _____ Mar. 5, 1957

FOREIGN PATENTS 743,043  Great Britain _____ Jan. 4, 1956

OTHER REFERENCES

Chem. Abst., vol. 53, p. 15010(g), 1959.
Chem. Abst., vol. 43, p. 3463(c), 1949.
Cook: J. Pharm. and Exptl. Therap, vol. 111, No. 2, pp. 131–141, June 1954.
Burger: Medicinal Chemistry, sec. ed., Interscience, 1960, pp. 360–361.